United States Patent [19]

Sidebotham et al.

[11] 4,137,393
[45] Jan. 30, 1979

[54] POLYESTER POLYMER RECOVERY FROM DYED POLYESTER FIBERS

[75] Inventors: Norman C. Sidebotham, Gulf Breeze; Paul D. Shoemaker; Clarence W. Young, III, both of Pensacola, all of Fla.

[73] Assignee: Monsanto Company, Decatur, Ala.

[21] Appl. No.: 785,477

[22] Filed: Apr. 7, 1977

[51] Int. Cl.$^2$ ............................ C08J 3/00; C08G 63/16; C08J 7/02

[52] U.S. Cl. ................................ 528/491; 260/2.3; 528/492; 528/493; 528/494; 528/495; 528/272; 528/308

[58] Field of Search .............................. 260/2.3, 75 T

[56] References Cited

U.S. PATENT DOCUMENTS

| | | | |
|---|---|---|---|
| 2,742,440 | 4/1956 | Stott et al. | 260/2.3 |
| 2,762,788 | 9/1956 | Siggel et al. | 260/75 T |
| 2,915,482 | 12/1959 | Nagle et al. | 260/2.3 |
| 2,945,840 | 7/1960 | Roberts et al. | 260/75 T |
| 3,043,785 | 7/1962 | Wright et al. | 260/2.3 |
| 3,108,082 | 10/1963 | Riehl et al. | 260/2.3 |
| 3,696,058 | 10/1972 | Teti | 260/2.3 |
| 3,701,741 | 10/1972 | Meyer, Jr. et al. | 260/2.3 |
| 3,873,314 | 3/1975 | Woo et al. | 260/2.3 X |
| 3,935,169 | 1/1976 | Reen | 260/75 T |

FOREIGN PATENT DOCUMENTS 608656 11/1960 Canada.

*Primary Examiner*—Wilbert J. Briggs, Sr.
*Attorney, Agent, or Firm*—Robert L. Broad, Jr.

[57] ABSTRACT

Polyester polymer is recovered from polyester fibers (in the form of filaments, yarns or fabrics and the like, both dyed and undyed), and used in the production of new undyed fibers, films, and other polymer products by the process of stripping the dye from the dyed polyester fibers and dissolving the polyester fibers in a solvent in a separate but functionally interrelated (with the dye stripping step) step; separating the dissolved fibers from any undissolved impurities, and thereafter separating the solvent from the polyester without precipitating the polyester by evaporating the solvent.

10 Claims, No Drawings

POLYESTER POLYMER RECOVERY FROM DYED POLYESTER FIBERS

BACKGROUND OF THE INVENTION (1) Field of the Invention

The invention relates to a process for recovering thermoplastic polymers, and particularly linear polyester polymers from polyester fibers or other linear polymeric products in the form of collections of polyester fibers, yarns, or fabrics, including dyed polyester fibers, and preferably starting with waste polyester fabrics, for use in production of new undyed thermoplastic polyester products. More specifically, the invention relates to a process for recovering polyester polymer by means of stripping the dye from dyed polyester fibers with a solvent; subsequently dissolving the polyester fibers in a solvent; thereafter recovering the polymer without precipitation thereof by evaporation of the solvent from the molten polymer.

(2) Prior Art

The consumption of thermoplastic polymers is greater than ten billion pounds per year. Some, such as polyethylene, polypropylene, polyvinylchloride, polystyrene, polyamides and polyester, surpass the billion pounds per year rate. The use of many of these relatively expensive thermoplastic polymers in synthetic fibers has also increased tremendously. It has been estimated that the world's consumption of synthetic fibers will reach some 12 million metric tons (26 billion pounds) by the year 1980, of which 4.6 million metric tons would constitute polyester fibers, 4.1 million metric tons would be polyamide fibers and 2.3 million metric tons will be polyacrylic fibers (*Chemical and Engineering News*, Feb. 2, 1970, p. 22).

Concomitantly the world is facing a shortage of raw materials for thermoplastic polymers, and sophisticated and efficient methods of recycling are needed.

Various methods have been described in the prior art for the recovery of thermoplastic polymer, including polyester polymers, from scrap polymer. Waste fibers, films, yarns and fabrics have also been garnetted and reprocessed for various uses including the manufacture of yarn and fabrics. Other methods of recovery include the dissolution of the polymer in various solvents; thereafter precipitating and recoverying the polymer. The objects of such processes were to avoid polymer degradation and/or to separate from the usable polymer the degraded polymer and/or monomers as impurities. These processes were slow and expensive, suitable only for laboratory usage. Moreover, they neither addressed themselves to nor did they solve dye removal problems.

Neither the prior art fabric recovery processes nor the polymer recovery processes have provided for efficient dye stripping in conjunction with polymer recovery, and most have not addressed the problem.

It will thus be recognized that a satisfactory and efficient process for recovery of polyester polymer from polyester polymer, fibers or fabric, would be a meritorious advance in the art. It would substantially reduce the raw material requirement for the world's largest fiber market.

SUMMARY OF THE INVENTION

In accordance with the present invention, a totally new process is provided whereby dye stripping and polymer recovery are combined in such a manner that the dye stripping step contributes to the dissolution in that after completion of the so-called "dye stripping" step the fibers retain some absorbed dye-stripping solvent which serves as a portion of the solvent used for dissolution of the polyester, so that only one solvent system may be employed.

Briefly, the inventive concept is a process for recovering polyester polymer from dyed polyester fibers or fabrics comprising:

(1) stripping the dye from polyester fabrics or fibers by contacting the dyed polyester fabrics or fibers with a dye-stripping solvent for polyester polymer at a temperature below that at which the polyester fiber is dissolved and above which the crystalline lattice of the polyester fibers swell so as to release the dye;

(2) then removing essentially all of the dye-containing solvent which is not absorbed by the fibers or fabrics;

(3) then contacting the wet solvent-laden fibers or fabric with sufficient addition of primary dissolution solvent under dissolution conditions for polyester fibers; and (4) thereafter separating the solvent or solvents from the polyester by evaporating the solvent from dissolved and/or molten polyester without precipitating the polyester from solution.

It is an advantage of this invention that the same solvent or solvent system may be used for both dye stripping and polymer recovery.

It is another advantage of this invention that solvent removal problems are thus greatly simplified.

It is yet another advantage of this invention that preferred solvent systems are employed efficiently and rapidly in the recovery process.

DESCRIPTION OF THE PREFERRED EMBODIMENTS

For the purposes of this description, solvents will be classified as "dye-stripping solvents" and "primary dissolution solvents." A "dye-stripping solvent," as used herein, is any solvent which swells the crystalline structure of the polyester fiber, at the same time dissolving and thereby removing conventional dyes and finishes. A "primary dissolution solvent" is a solvent whose primary function in the course of this invention is to dissolve the polyester. Preferably it will be capable of dissolving a significant amount of polyester, at moderate temperatures, all the while permitting evaporation at a later stage at some higher temperature. Of course it is preferred, according to this invention, that the dye-stripping solvent and the primary dissolution solvent be the same, and such identity is one aspect of the instant invention. If identical solvents are not used, it is desirable that they be compatible, in the sense that they do not functionally interfere with one another and they are readily separable or functionally interchangeable, as this will permit a much more simplified recovery system. It is also preferred that the solvents employed in this invention do not significantly degrade or depolymerize the polyester.

Suitable dye stripping solvents include most of the so-called "polyester dye carriers." It is well known, for example, that most of the following compounds will cause an increase in the diameter of the polyester fiber immersed therein: phenol, meta-cresol, tetrahydronaphthalene, ortho-phenylphenol, para-phenylphenol, and such compounds may be employed as dye stripping solvents or primary dissolution solvents. Other known solvents and solvent systems for polyester which may be employed for both dye removal and dissolution include para-chloroanisole; nitrobenzene; acetophenone; dimethyl sulfoxide; 2,6 dimethyl phenol; quinoline; ortho-chlorophenol and trichlorophenol. Other known polyester solvents and solvent systems which are useful include compounds having at least one and more commonly two or more carbocyclic rings in their structure such as diphenyl, diphenyl ether, naphthalene, methyl-naphthalene, benzophenone, diphenylmethane, para-dichlorobenzene (above 174° C.), acenaphthene, phenanthrene and similar compounds. Naphthalene has been found especially suitable for the practice of this invention for dye stripping and primary dissolution solvent because the solubility of polyester in naphthalene is a strong function of temperature, ranging from negligible solubility at 170° C. to 55 percent polyester solubility at 218° C. (boiling point of naphthalene). To a greater or lesser extent all of the above may be employed as "dye-stripping solvents" as well as "primary dissolution solvents" for polyester in accordance with this invention. Preferred for both dye stripping and dissolution in naphthalene at temperatures between 80° C. and 170° C.

The preliminary dye removal may be accomplished by any method of immersing or otherwise intimately contacting and agitating a fiber or fabric collection with the dye-stripping solvent, in any manner which produces a net reduction of final dye concentration in the fiber or fabric collection. Any one of the following methods may be used to accomplish the preliminary dye removal. Although the starting material is described as "fabric" or "fabric collection," it should be construed in the broadest sense to include "fibers" as hereinafter defined.

1. Contacting a batch of fabric with a large amount of dye-stripping solvent, which quantity is large enough to dilute the dye concentration in the fabric to the desired level.

2. Contacting a batch of fabric with dye-stripping solvent. The dye-contacting solvent is agitated if desired and continuously removed and replaced with fresh or relatively dye-free dye-stripping solvent, in sufficient quantity to reduce the fabric's dye concentration to the desired level.

4. Fabric or a fabric collection is continuously moved along a path or conduit in one direction while simultaneously being contacted with a dye-stripping solvent, which solvent is more or less continuously flowing in a direction opposite to the movement of the fabric. Fresh or relatively dye-free dye-stripping solvent is added in a manner which maintains a relatively continuous flow of the dye-stripping solvent, and the dye-containing dye-stripping solvent is more or less continuously removed at or near the place where the fabric or fabric collection is first contacted with the dye-stripping solvent.

5. Fabric or a fabric collection is successively contacted with dye-stripping solvent in a multiplicity of dye-stripping solvent contact stages, with said contact stages arranged in such a manner that each subsequent contact stage reduces the dye concentration in the fabric collection; especially a counter-current flow arrangement of contact stages, in which fresh or relatively dye-free dye-stripping solvent is added only to the final fabric contact stage, with a more or less equal amount of dye-containing dye-stripping solvent removed from the final stage and added to the dye-stripping solvent in the next-to-final contact stage, such counter-current flow replenishment continued for as many contact stages as are used, with the dye-laden dye-stripping solvent removed from the first fabric contact stage.

Of course, in these dye-stripping solvent contacting processes, the fabric or fabric collection may be added to the dye-stripping solvent, or the dye-stripping solvent may be added to the fabric or fabric collection. Similarly, of course, the fabric may be moved through dye-stripping solvent which is kept more or less in one place; or the fabric may be held more or less at one place while the dye-stripping solvent is moved into contact with and subsequently removed from the fabric or fabric collection; or, both the fabric and dye-stripping solvent may be moved simultaneously or alternately.

For efficient dye stripping without polymer loss, the temperature of the dye-stripping solvent during the dye stripping phase must be below the temperature at which there is significant dissolution of the polyester fibers. However, it is well known among textile dyeing and finishing experts that most efficient dye stripping of polyester fibers will occur at the highest temperature practical because swelling of the crystalline lattice of the polyester is greatest at the higher temperature. A significantly lower temperature will decrease swelling of the fiber, and at just above the freezing or solidification point of the solvent, there will be little or no dye stripping. Preferred, therefore, is the highest temperature below which there is significant dissolution of the polyester feedstock.

Apparatus or equipment which may be used for the preliminary dye removal operation include tanks or vats, which may be agitated or not agitated, whether open top or covered or sealed to hold pressure or vacuum; bowl-type washing machines; centrifugal filters, with or without provisions for solvent rinsing or continuous or intermittent removal of fabric; continuously or intermittently moving conveyor belts passing through solvent-contacting zones; screw conveyor devices; and solvent spraying devices.

When the preliminary dye stripping step is completed, and the dye-containing dye stripping solvent is removed, the remaining wet fabric or collection of fabrics containing residual dye and solvent is contacted with sufficient additional relatively dye-free primary solvent under dissolution conditions for the polyester fibers. Of course, the residual dye-containing solvent-laden fabric may be added to the primary solvent, or the primary solvent may be added to the fabric. As previously mentioned, the additional primary dissolution solvent may or may not be the same solvent or solvent system as employed for dye stripping; but it is preferable to use the same solvent or solvent system for process efficiency, simplicity, and economy. A recycling system is much preferred over a non-recycling system; and it might well be essential to the commercial feasibility of the process. Incompatible solvents or solvent systems would add to the complexity and cost of any such recycling.

When the polyester fibers have dissolved, the solution may be filtered, if desired, to remove any undissolved impurities.

We have found that polyester can be recovered from a molten polyester solution by heating the solution somewhat above the boiling point of the solvent, removing the solvent vapor (for subsequent condensation and reuse), possibly displacing the solvent vapors with another gas such as an inert gas sweep. The removal of solvent by atmospheric boiling is usually slow and may require temperatures so far above the melting point of the polyester that polymer degradation can occur. Residual solvent after atmospheric pressure solvent removal steps is high. In a solution composed of 70% napthalene and 30% polyester, for example, atmospheric boiling at 260° failed to remove at least about 12% of the naphthalene. It has therefore been found that much more efficient procedure for the recovery of polyester from most dissolution solvents, including the preferred class having at least one and more commonly two or more of the aromatic rings in their structure, is to boil vigorously at atmospheric pressure for a short time using a heat transfer medium slightly above the melting point of the polyester; and then sustain this vigorous boiling by applying a vacuum to the molten solution.

Of course temperature and pressure interact during the vacuum solvent boil off. If the vacuum is applied too rapidly, very rapid vaporization of solvent cools the solution enough to freeze the polyester. If the polyester solution freezes (even only partially), the vaporization process is slowed considerably, and the recovered polyester will contain much more residual solvent. The higher the temperature of the molten polyester solution, the faster the vacuum can be applied for rapid solvent removal without freezing. As mentioned before, however, higher temperatures (in excess of about 285° C.) can promote polyester degradation; and therefore a balance must be maintained between the solution temperature and the rate of vacuum application.

A polyester is defined as synthetic linear condensation-type polymer whose repeating units contain the ester group,

these groups being integral members of the linear polymer chain. Polyesters may be those derived from aliphatic dibasic acids such as oxalic, succinic, glutaric, adipic, and sebacic acids and glycols such as ethylene glycol, propylene glycol, trimethylene glycol, hexamethylene glycol and decamethylene glycol. Polyesters may also be derived from aromatic dicarboxylic acids such as terephthalic acid and isophthalic acid and glycols such as ethylene glycol and propylene glycol. Representative examples include poly(ethylene terephthalate), poly(trimethylene terephthalate), poly(tetramethylene terephthalate), poly(ethyleneisophthalate), poly(octamethylene terephthalate), poly(decamethylene terephthalate), poly(pentamethylene isophthalate), poly(tetramethylene isophthalate), poly(hexamethylene isophthalate), poly(hexamethylene adipate), poly(pentamethylene adipate), poly(pentamethylene sebacate), poly(hexamethylene sebacate), poly(1,4-cyclohexylene adipate), poly(1,4-cyclohexylene sebacate), poly(ethylene terephthalate-co-sebacate), and poly(ethylene-co-tetramethylene terephthalate).

Unless otherwise indicated, the term "polyester fibers," as used herein to described the starting material which is subjected to dye stripping and recovery in accordance with this invention, includes polyester filaments, monofilaments, bands, ribbons, tubes, films, and other constructions of linear polyester polymer and includes yarns, threads, fabrics and other products into which these constructions may be incorporated as well as common impurities associated with such products, new or old.

EXAMPLE 1-9

In all examples, the feedstock was first prewashed in naphthalene at 165° C. wherever dye stripping was included as a step in the procedure. Polyester feedstock was then dissolved in naphthalene at about 30% polyester and at a solutioning temperature of about 210° C. The solution was then filtered to remove any insoluble contaminates such as nylon, acrylics, paper, cotton, wool, silk, rayon, acetate, glass or metals. The polyester/naphthalene solution was then boiled in an oil-heated three-neck boiling flask, fitted with a thermometer, an inert gas purge nozzle, and a short air-cooled condenser connected to a two-neck flask, which functioned as a naphthalene collector. A small purge of inert gas was used to sweep napthalene vapors into the condenser. Boiling was first accomplished at a temperature of about 218° C. as the first heating oil temperature was subsequently increased to about 270° C. When the rate of boiling declined, a vacuum was slowly applied to the apparatus through the second neck of the naphthalene collector. A vacuum regulator was used to control the vacuum pull-down rate on the boiling solution to minimize foaming, splashing, and possible freezing of the solution. When solvent removal was completed, the vacuum was replaced with dry nitrogen and the flask was removed from the hot oil. The inert blanket was maintained as the polyester cooled and froze. The flask was wrapped with cloth as it cooled, because expansion of the solidifying polyester always broke the flask. After cooling was complete, the polyester product was recovered from the broken flask for analysis and subsequent spinning to fiber.

Using a controlled polyester flake stock having an intrinsic viscosity of 0.6413, the following recovery processes were conducted as above employing a finishing vacuum as indicated.

Table I

| Examples | Finishing Vacuum (mm Hg) | Residual Naphthalene (Wt. %) | Intrinsic Viscosity Of Product |
|---|---|---|---|
| 1 | 760 | 11.83 | 0.6631 |
| 2 | 500 | 8.88 | 0.5915 |
| 3 | 300 | 3.15 | 0.6398 |
| 4 | 150 | 1.00 | 0.6651 |
| 5 | 80 | 0.12 | 0.6726 |
| 6 | 42 | ND* | 0.7004 |
| 7 | 42 | 0.06 | 0.6610 |
| 8 | 24 | ND* | 0.9975 |
| 9 | 23 | ND* | 0.7707 |

*not experimentally determined

As can be seen from the above, there was no significant drop in the intrinsic viscosity of the product, and in some cases it appeared that the viscosity was increased. Any such increase is believed to have been caused by further polymerization occuring during the vacuum removal phase.

EXAMPLE 10

Mixed dyed polyester waste fabric was subjected to the naphthalene dye stripping and dissolution procedures, with the result that although the initial intrinsic viscosity could not be ascertained, recovered polymer of comparable fiber viscosity was obtained which appeared to be reasonably pure based on color observation. These recovered polymer samples were of a quality which were suitable for melt spinning into synthetic fibers. The spinning procedure was to place chunks of recovered polyester in a laboratory autoclave; pressurize several times with dry nitrogen; place a vacuum (20–40mm Hg) on the autoclave; heat the autoclave until the polyester melts; bleed off the vacuum with dry nitrogen; remove the agitator shaft and put on a spinneret pack; apply dry nitrogen pressure to form filaments from the spinnerets; and take up bobbins of the fiber on a Lessona Type 955 winder. Spun bobbins were subsequently drawn over a hot pin at 105° C. at several known draw ratios and physical properties of the drawn fiber were measured. Only crude indications of spinnability and drawability were obtained due in large part to the lack of denier control. The intrinsic viscosity of the recovered prewashed polyester mixed rag feedstock was 0.6867. The spun yarn (10 filaments with conventional fiber finish) was successfully drawn over a hot pin at 105° C., with drawn fiber properties as indicated in Table II.

TABLE I

| Draw Ratio | Drawn Denier | Tenacity g/d | Elongation % |
|---|---|---|---|
| 4.78 | 85.5 | 3.88 | 15.37 |
| 5.00 | 83.0 | 4.33 | 10.62 |
| 5.50 | 77.5 | 3.43 | 7.23 |

EXAMPLE 11

Naphthalene was employed as the dye stripping solvent in the process generally described in numbered Paragraph 5 above at a temperature of 160° C. At the completion of six wash stages, the ratio of solvent dilution weight to polyester weight was about 8. It was observed that at temperatures above 170°, naphthalene dissolves a substantial amount of polyester. It was also observed that naphthalene can be washed off the dye-stripped polyester with 1,1,1-trichloroethane, dichloromethane, or acetone.

Having thus described our invention and several embodiments thereof, what we desire to claim and secure by letters patent is:

1. A process for recovery, in a form suitable for reuse in production, of polyester polymer from collections of polymeric materials comprising dyed polyester fibers comprising:
   (1) stripping the dye from said dyed polyester fibers by contacting the collections with a dye-stripping solvent at a temperature below which the polyester dissolves and above which the crystalline lattice of the polyester fiber swells so as to release the dye;
   (2) removing the excess of the dye-containing dye-stripping solvent which is not absorbed by the fabric;
   (3) contacting the dye-stripping solvent-laden fiber with sufficient addition of a primary dissolution solvent to dissolve the polyester fibers; thereby creating a dissolved polyester component;
   (4) separating the residual dye-stripping solvent and the primary dissolution solvent from the polyester component by evaporation of the solvent without precipitating the polyester component from solution.

2. The process of claim 1 wherein the dye-stripping solvent is compatible with said primary dissolution solvent.

3. The process of claim 1 wherein the dye-stripping solvent is the same as the primary dissolution solvent.

4. The process of claim 1 wherein the primary dissolution solvent includes a compound selected from the group consisting of: para-chloroanisole; nitrobenzene; acetophenone, dimethyl sulfoxide; 2,6-dimethyl phenol; quinoline; naphthalene; meta-cresol; phenol; tetrahydronaphthalene; ortho-phenylphenol; para-phenylphenol; trifluoroacetic acid; ortho-chlorophenol; trichlorophenol; diphenyl; diphenyl ether; methyl naphthalene; benzophenone; diphenyl methane; dimethyl formamide; para-dichlorobenzene; diphenyl methane; acenaphthene; and phenanthrene.

5. The process of claim 1 wherein the primary dissolution solvent is a solvent characterized by at least one carbocyclic ring.

6. The process of claim 1 wherein the primary dissolution solvent is selected from the group consisting of naphthalene, diphenyl, diphenyl ether, methyl naphthalene, benzophenone, diphenyl methane, phenanthrene, acenaphthene and para-dichlorobenzene.

7. The process of claim 6 wherein the primary dissolution solvent is naphthalene.

8. The process of claim 1 wherein separation of the dye-stripping solvent and the primary dissolution solvent from the polyester component without precipitating the polyester component from solution is achieved by evaporation of the dye-stripping solvent and the primary dissolution solvent.

9. The process of claim 7 wherein evaporation is achieved by boiling at atmospheric pressure and then by applying a vacuum to complete removal of the solvents.

10. The process of claim 7 wherein dye-stripping solvent in the primary dissolution solvent is naphthalene, and the vacuum removal of solvent is conducted at a pressure between atmospheric and 23 mm Hg absolute.

* * * * *